No. 621,016.  
E. H. BARNHART.  
INSECT TRAP.  
(Application filed Dec. 24, 1898.)  
Patented Mar. 14, 1899.
(No Model.)
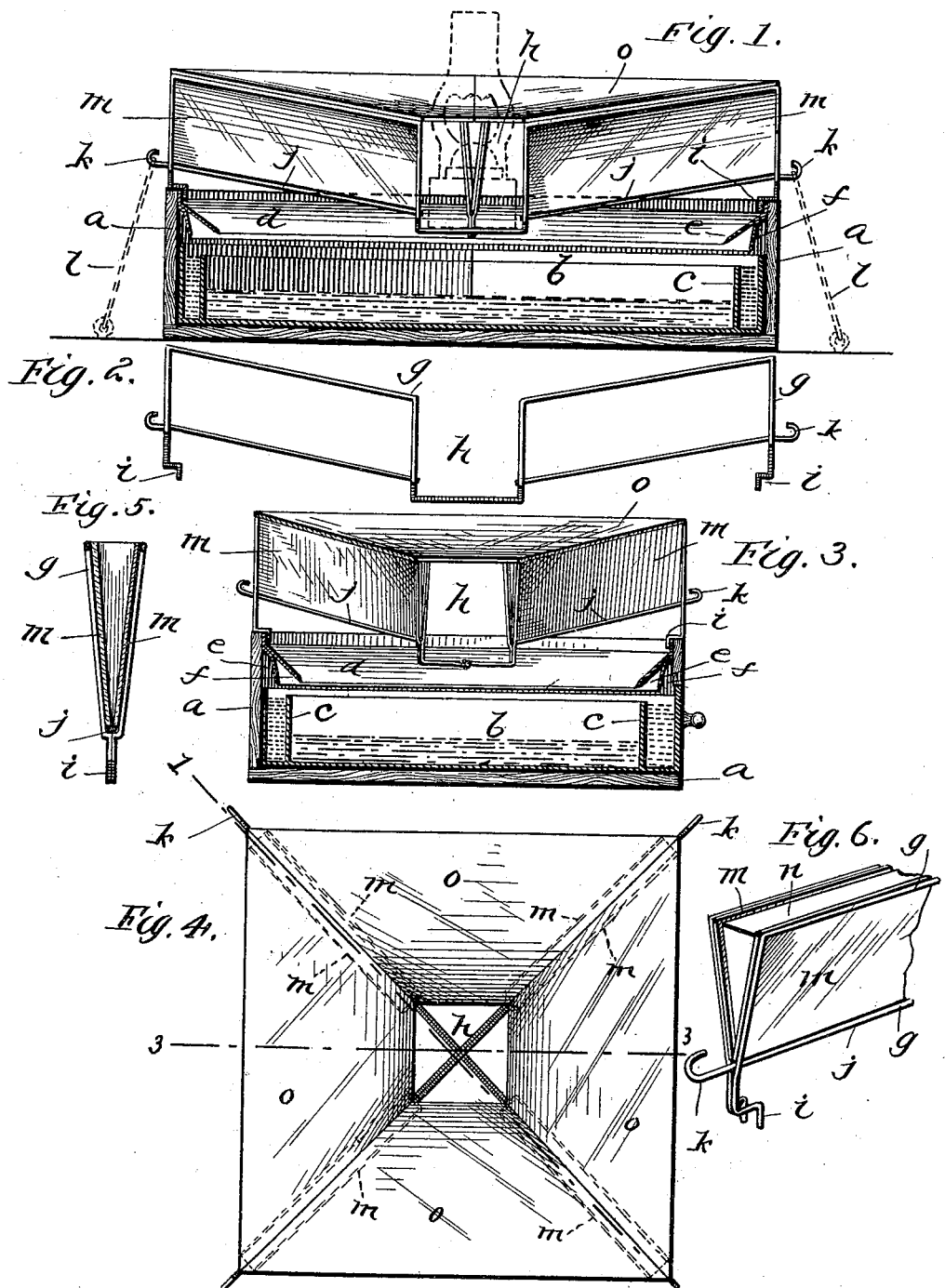

UNITED STATES PATENT OFFICE.

ELBERT H. BARNHART, OF UDALL, KANSAS.

INSECT-TRAP.

SPECIFICATION forming part of Letters Patent No. 621,016, dated March 14, 1899.

Application filed December 24, 1898. Serial No. 700,190. (No model.)

*To all whom it may concern:*

Be it known that I, ELBERT H. BARNHART, a citizen of the United States, and a resident of Udall, county of Cowley, and State of Kansas, have invented certain new and useful Improvements in Insect-Traps, of which the following is a specification, in which—

Figure 1 is a vertical sectional view taken on the line 1 1 of Fig. 4, the lamp and fastening cords or wires being shown in dotted line; Fig. 2, a detail view of one of the wire frames for suspending the combined deflectors and reflectors; Fig. 3, a vertical sectional view on the line 3 3 of Fig. 4; Fig. 4, a plan view of the apparatus; Fig. 5, a vertical sectional view of one of the radial combined reflectors and deflectors, and Fig. 6 a detail perspective of the outer end of the same.

This invention relates to that class of insect-traps which employ a central light to attract night-flying insects and suitable means for trapping and destroying them; and the object of the invention is to provide a simple and practical apparatus that will effectually throw or reflect the light upward and outward and downward in all directions from the central light, thereby extending the attractive power of the apparatus over a wide field and consequently greatly increasing its destructive capacity, the reflecting-surfaces having the further function of deflecting the approaching insects into a suitable cage below, as more fully hereinafter set forth.

The invention has other objects in view, which will appear in the course of this specification.

The apparatus consists, essentially, of two sections or members, the lower member consisting of a suitable rectangular case or box $a$, having a closed bottom and an open top, one of its sides being open for the insertion and removal of a pan $b$, which fits loosely within the casing and is provided with a supplemental wall or partition $c$, which rises from its bottom a short distance in from the outer wall of the pan, thereby converting the pan into an inner compartment and an outer compartment, which are adapted in the use of the apparatus to be filled to a suitable height with a suitable liquid. Attached to the inner wall of the case $a$ and extending entirely around it above the pan is a shield or guard $d$, which consists, essentially, of two flanges extending downward and inward to near the upper edge of the pan, the lower edges of the flanges being knife-edged and the flanges being so disposed angularly with reference to each other and the inner wall of the box that two spaces $e$ and $f$, substantially V-shaped in cross-section, are formed entirely around the box just above the pan, these spaces being widest of course at their lower portions. The other member of the apparatus is superposed upon the cage or trap above described and is preferably constructed of a light wire frame adapted to be suspended over the trap and to be readily removed therefrom, this frame supporting the combined reflectors and deflectors. This suspension-frame consists of two wire frames $g$, (shown in detail in Fig. 2,) arranged diagonally of the cage and crossing each other at the center thereof. Each frame is depressed at the center to form a cage or holder $h$ for the lamp or other illuminating device, and the lower ends of the vertical wires at the ends of the frame are formed into angular hooks $i$, which engage over and rest upon the walls of the cage, thereby supporting the frames. The lower wires $j$ of the frames are extended outward therefrom and formed into hooks $k$ for the attachment of suitable fastening cords or wires, (shown in dotted lines at $l$ in Fig. 1,) whereby the frames may be fastened upon the cage and the entire apparatus to its support. The frames from the lamp-holding cage $h$ incline upward and outward at an angle of about ten degrees. Each of the frames $g$ carries four reflectors $m$, radiating from the center, two being arranged at either side of the light-holder in pairs. The reflectors of each pair incline downward toward each other, a suitable wedge-shaped block $n$ being interposed between them to hold them at the proper angle firmly in the frame. These reflectors also incline longitudinally upward and outward from the light, as shown.

Resting upon the frames is a cover or top, preferably consisting of a series of four segmental plates $o$, which incline upward and outward from the light-holder, these plates having their upper and lower surfaces highly polished, so that the light will be reflected from both of said surfaces. The adjoining edges of these plates abut where they rest upon the radial frames $g$, and the plates are readily removable from the frames. It is evident that these plates may be made integral, if desired.

The reflectors $m$ are preferably made of mirror-glass, while the cover-plates $o$ are preferably made of highly-polished or other bright-surfaced metal. It will be observed that when a light of a suitable sort is placed within the light-holder the reflectors will not only throw or reflect the light upward, thus attracting insects from the tree-tops and the region above the apparatus, but will also reflect it outward and downward in all directions, thereby covering practically the entire region in the vicinity of the apparatus, making little or no shadows. Both the top reflectors and the radial reflectors in addition serve to deflect the insects as they approach the light into the cage below. When the insects fall into the cage, it is practically impossible for them to escape, being poisoned or drowned by remaining in the liquid. Should the insects escape from the inner compartment of the pan, they would have to get across the outer compartment, then climb up the wall of the casing and across the two V-shaped spaces $e$ and $f$ and around the knife-edges of the inclined guard-flanges, which would be practically impossible, thereby insuring the destruction of all the insects that are entrapped. It will be observed that the pan may be removed and emptied without disturbing the apparatus in the least. It will also be observed that I am not confined to the specific features shown and described. For instance, the apparatus may be made any other shape than rectangular and the number of reflectors may be increased or diminished without departing from the spirit of the invention. It will also be seen that the superstructure carrying the peculiar arrangement of the reflectors may be used with any other form of cage that may be found suitable; also, that the specific construction of the frames supporting the reflectors may be varied at will.

Having thus fully described my invention, what I claim, and desire to secure by Letters Patent, is—

1. The combination of a cage having an open top, a pan therein adapted to hold a liquid, a guard attached to the walls of the cage above the pan and consisting essentially of two knife-edged flanges inclining inward and downward and so disposed angularly with reference to each other and the inner wall of the cage as to form the two spaces $e$ and $f$ substantially V shape in cross-section and extending entirely around the cage, and means supported above the cage for deflecting the insects thereinto.

2. The combination of a casing open at its upper side, means supported above the casing for deflecting insects thereinto, a pan adapted to be removed through the side of the casing and having double walls, forming inner and outer liquid-holding compartments, and a guard or shield extending entirely around the casing above the pan.

3. The combination of a cage and means superposed thereon for attracting and deflecting insects into the cage, said means consisting of a frame carrying a series of radial reflectors, said reflectors inclining longitudinally upward and outward, a cover supported on said frame and inclining upward and outward and having its upper side formed into a reflecting-surface, and a light-holding device located in the center of said frame, substantially as and for the purpose set forth.

4. The combination of a cage, a frame thereon having a central lamp-receptacle and carrying a series of radial reflectors and a top reflector supported on said frame and inclining upward and outward, both the upper and lower faces of this reflector being reflecting-surfaces.

5. The combination of a cage, a frame supported thereover and having a central light-receptacle and carrying a series of radial reflectors and a top or cover inclining upward and outward from the light-receptacle and having its upper and lower faces adapted to reflect light, as and for the purposes set forth.

6. The combination of a cage, a frame supported thereover and provided with a central lamp-holder and carrying a series of pairs of radial reflectors, the adjacent reflectors inclining inward and downward toward each other, and a top supported on said frame.

7. The combination of a cage or trap, a frame supported thereover and consisting of two separable frames supported on the cage and crossing each other at the center, these frames being formed into a lamp-holder at the point of crossing, a series of radial deflectors carried by these frames, and a deflecting top or cover plate also carried by these frames.

8. The combination of a cage or trap, a superstructure thereover and removable therefrom, this superstructure consisting essentially of two separable wire frames crossing each other at the center and formed into a lamp-holder at the point of crossing, and a series of radial reflecting and deflecting plates carried by these frames, and a series of removable top plates inclining upward and outward from the lamp-holder.

In testimony whereof I hereunto affix my signature in the presence of two witnesses.

ELBERT H. BARNHART.

Witnesses:
JOHN LINDSTROM,
I. U. BARNHART.